June 10, 1930.                L. W. BARBER ET AL                1,763,081
                              SIDE BEARING FOR CARS
                         Filed Feb. 25, 1928      2 Sheets-Sheet 1
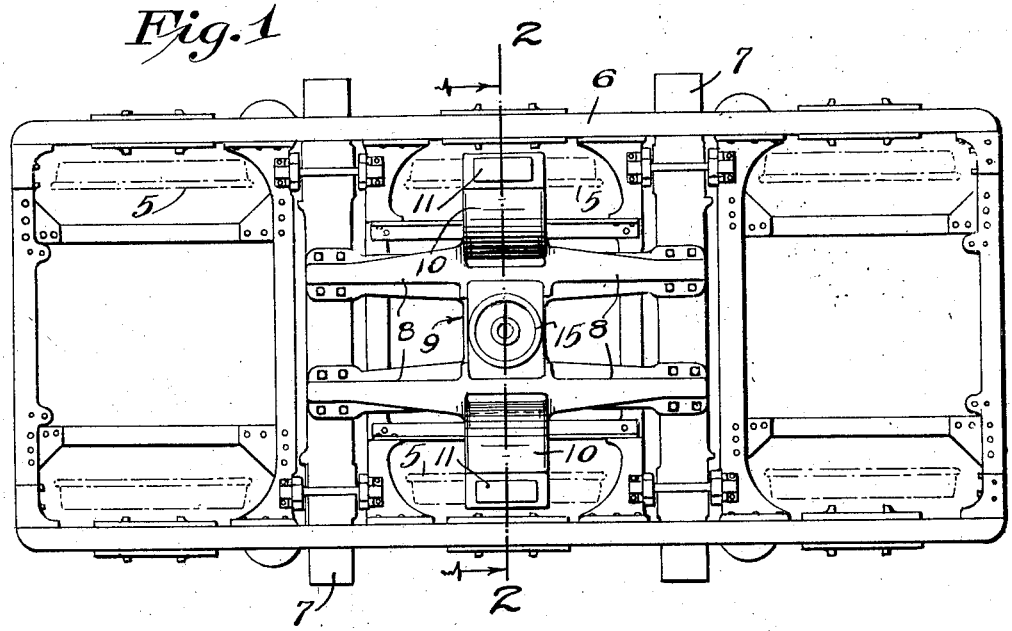
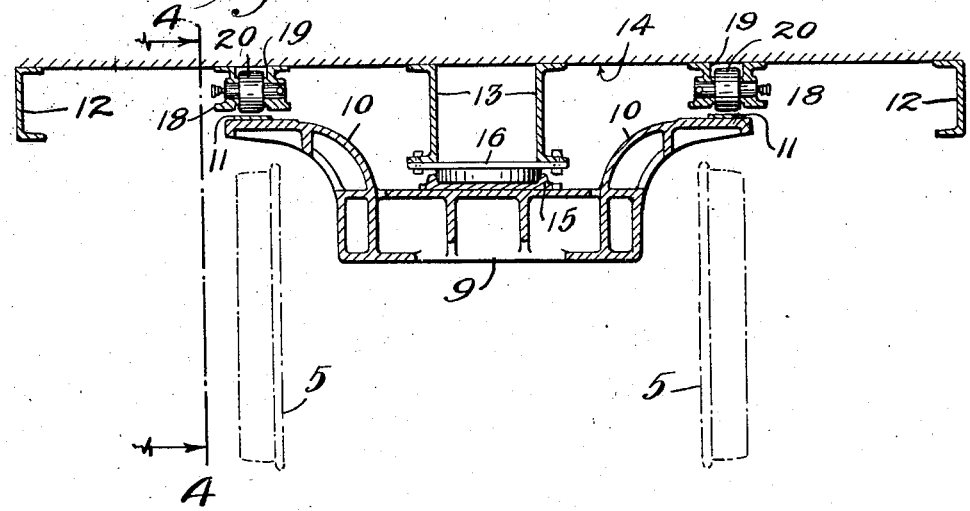
Inventors

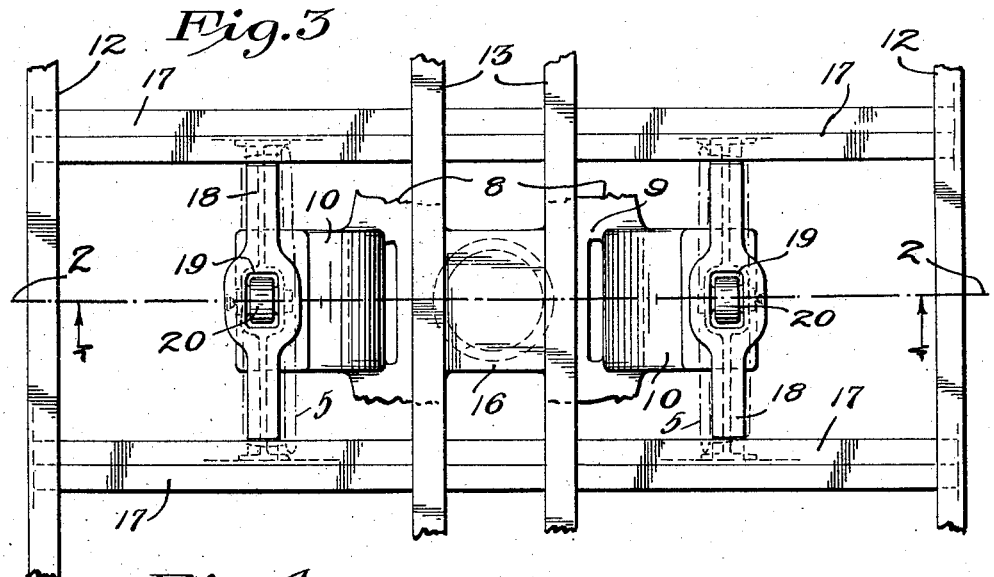
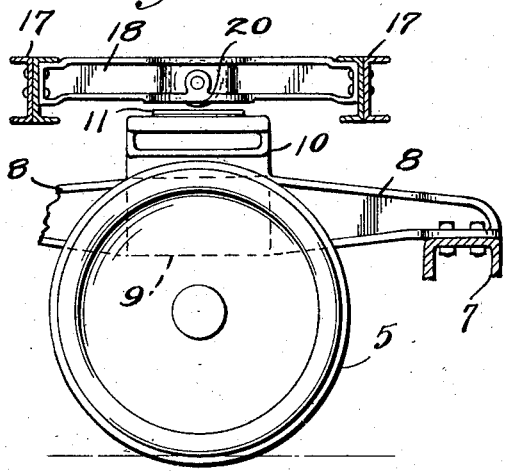

Patented June 10, 1930

1,763,081

UNITED STATES PATENT OFFICE

LEE W. BARBER AND EDWIN W. WEBB, OF CHICAGO, ILLINOIS, ASSIGNORS TO STANDARD CAR TRUCK COMPANY, OF CHICAGO, ILLINOIS, A CORPORATION OF NEW JERSEY

SIDE BEARING FOR CARS

Application filed February 25, 1928. Serial No. 256,972.

Our invention relates to roller side bearings for car bodies and has for its object to provide improved means for supporting the side bearing rollers on the car body and the co-operating roller treads on the car truck; and to this end, our invention consists of the novel devices and combination of devices hereinafter described and pointed out in the claim.

The invention is especially well adapted for use on cars wherein both the truck and the car body are provided with pairs of cross-connected bolsters, for bringing the side bearing rollers on the car body and the treads for the same on the truck into the best positions for the most advantageous co-operation with each other.

In the broad or generic point of view, our present invention may be said to be a new species of the invention disclosed and broadly claimed in U. S. Patent 1,149,234, of date August 10, 1915, granted to the Standard Car Truck Company, as the assignee of Edwin W. Webb.

The preferred form of our invention is illustrated in the accompanying drawings, wherein, like notations referring to like parts throughout the several views, Fig. 1 is a plan view of a six wheel car truck provided with the roller treads needed for co-operation with the side bearing rollers carried by the car body;

Fig. 2 is a vertical cross section on the line 2—2 of Figs. 1 and 3, with some parts removed and others shown in dotted lines;

Fig. 3 is a plan view of some portions of the under frame of the car body and some portions of the underlying car truck with some parts broken away; and Fig. 4 is a longitudinal vertical section on the line 4—4 of Fig. 2, with some parts removed.

The numerals 5 represent the truck wheels. The numerals 6 represent the top part of the truck frame. The numerals 7 represent a pair of cross-connected truck bolsters suitably supported on the side frame 6. As shown, the cross connections uniting said pair of bolsters 7 include a pair of spanners 8 rigidly secured at their ends to the said bolsters 7 and a bed plate 9 for the truck center plate, which bed plate 9 as shown, is formed integral with the spanners 8. The said bed plate 9 has cast integral therewith a pair of tread bearing arms 10 which extend upwardly and outwardly from the bed plate 9 and carry, on the upper faces of their outer ends, tread plates 11 for co-operation with the side bearing rollers on the car body hereinafter noted. The said tread bearing arms 10 are of such form and so located that they will support the treads 11 directly over the wheel base lines of the truck. The numerals 12 represent the side sills of the under frame of the car body. The numerals 13 (Figs. 2 and 3) represent the central sills of the under frame of the car body and the numerals 14 (Fig. 2) represent the bottom or lower line of the shell of the car body, which, of course, is rigidly secured to the sills 12 and 13. The bed portion 9 of the cross connections 8 and 9 which connect the truck bolsters 7, is provided with a center plate 15 and to the center sills 13 of the under frame of the car body is secured a center plate 16, which plates 15 and 16 co-operate in the usual way to permit the swivelling motion of the car body in respect to the car truck.

The numerals 17 represent a pair of cross-connected body bolsters which are rigidly secured to the side sills 12 and the central sills 13 of the under frame of the car body. The cross connections include two arch bars 18 having pockets 19 in which are journaled side bearing rollers 20; and these arch bars 18 are so disposed on the opposite sides of the cross center of the car body that they overhang the wheel base of the truck directly over and in position to co-operate with the treads 11 carried by the arms 10 of the truck, as best shown in Figs. 2 and 4 of the drawings. It follows, from the foregoing construction, that whenever the car body tilts sidewise, one of the side bearing rollers 20 will contact with and travel radially over the treads 11 of the truck when any swinging motion of the car body relative to the car truck occurs. Of course, if the load within the car body 14 should be applied in such a way that it would not be balanced crosswise of said car body, then the car body might tilt downward, on its overloaded side, far enough to bring the side bearing rollers 20, on that side of the car body, into contact with the underlying treads 11 of the truck, at a time when no swinging motion of the car body relative to the truck in the longitudinal plane was taking place.

In practice it has been found to be a decided advantage to have the side bearing rollers carried by the car body and the treads for the same carried by the car truck in such positions that they will overhang the wheel bases of the truck; and we believe that the combinations of parts herein disclosed for securing that result, are new over the entire prior art.

In cars having six-wheel trucks, like the instance illustrated in the drawings, the side bearing rollers 20 carried by the car body and the treads 11 for the same carried by the truck, directly overhang the central set of the truck wheels; but in a car having four-wheel trucks, with our invention embodied therein, the roller bearings 20 on the car body and the underlying treads 11 for the same on the truck, would not directly overhang any of the truck wheels, but would overhang the wheel base lines of the truck.

Of course, it will be understood that the form of the truck frame and the form of the underframe and shell of the car body, might vary widely from the forms illustrated in the drawing, as long as said parts were adapted to have our invention, herein disclosed and claimed, applied thereto.

What is claimed is:—

The combination with a car truck having a pair of cross-connected bolsters carrying on their cross connections side bearing roller treads overhanging the wheel base, of a car body having a pair of cross-connected body bolsters carrying on their cross connections side bearing rollers, adapted to contact with and travel over said treads of the cross-connected truck bolster substantially as described.

In testimony whereof we affix our signatures.

LEE W. BARBER.
EDWIN W. WEBB.